US006826762B2

(12) United States Patent
Shell et al.

(10) Patent No.: US 6,826,762 B2
(45) Date of Patent: Nov. 30, 2004

(54) RADIO INTERFACE LAYER IN A CELL PHONE WITH A SET OF APIS HAVING A HARDWARE-INDEPENDENT PROXY LAYER AND A HARDWARE-SPECIFIC DRIVER LAYER

(75) Inventors: Scott R. Shell, Redmond, WA (US); Roman Sherman, Bellevue, WA (US); Alan W. Shen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 602 days.

(21) Appl. No.: 09/788,317

(22) Filed: Feb. 16, 2001

(65) Prior Publication Data
US 2002/0184407 A1 Dec. 5, 2002

(51) Int. Cl.[7] ................................. G06F 1/12
(52) U.S. Cl. ..................... 719/328; 719/311; 719/313; 719/321; 719/322; 719/327; 719/329
(58) Field of Search ................. 719/311, 313, 719/321, 322, 327, 328, 329; 709/310

(56) References Cited

U.S. PATENT DOCUMENTS

| 6,018,571 A | 1/2000 | Langlois et al. ............ 379/207 |
| 6,141,564 A | 10/2000 | Bruner et al. ................ 455/558 |
| 6,269,254 B1 * | 7/2001 | Mathis ........................ 455/557 |
| 6,584,185 B1 * | 6/2003 | Nixon .................... 379/201.01 |
| 2002/0052968 A1 * | 5/2002 | Bonefas et al. ............. 709/231 |

FOREIGN PATENT DOCUMENTS

| EP | 0994614 A2 | 4/2000 | ........... H04L/29/06 |
| WO | WO96/06393 | 2/1996 | ............. G06F/9/44 |

OTHER PUBLICATIONS

Tso, Mike et al., "Always On, Always Connected Mobile Computing," *Universal Personal Communications*, 1996 IEEE International Conference on Cambridge, MA, USA, Sep. 29–Oct. 2, 1996, New York, NY, pp. 918924.

Steeman, H., "Wireless Application Protocol (WAP)," *Elektor Electronics*, vol. 26, No. 289, Jun. 2000, pp. 5658.

*Bridging Wireless and Wired Networks: Smart Phone Operating Systems, IP Convergence and Market Segmentation* G. E. Darby; *Info vol. 1, No. 6*, 1999; pp. 563–576.

*Design: Designing Mobile Phones and Communicators for Consumer Needs at Nokia*; Kaisa VaananerVainio–Mattila and Satu Ruuska; *Interactions* 6,5 (Sep. 1999), pp. 23–26.

(List continued on next page.)

*Primary Examiner*—Nabil El-Hady
(74) *Attorney, Agent, or Firm*—Merchant & Gould

(57) ABSTRACT

A Radio Interface Layer (RIL) is disclosed. The RIL comprises an API set which provides a level of abstraction between the radio on a cell phone and the software of the cell phone. The API set of RIL is roughly based on the GSM AT interface as defined in GSM specifications 07.05 and 07.07. The API set provides access to functionality contained within a cellular telephone, such as a GSM or CDMA compatible telephone. These APIs allow applications running on an operating system in the cellular telephone to issue commands without knowledge of the underlying radio structure of the cellular telephone and specific knowledge of the GSM-type commands. For example, these APIs allow the applications to access to phonebook entries, restrict access to data and functionality using passwords, access file and message storage, and perform many other functions. The RIL is divided into a hardware-independent proxy layer, called by various software components, and a driver layer that is hardware-specific.

30 Claims, 4 Drawing Sheets

OTHER PUBLICATIONS

*Making Place to Make IT Work: Empirical Explorations of HCI for Mobile CSCW*, Steinar Kristoffersen and Frederik Ljungberg; *Proceedings of the International ACM SIG-GROUP Conference on Supporting Group Work*, 1999, pp. 27–85.

*Mobile Computing: Beyond Laptops*; Laura Cappelletti; *Proceedings of the 15th Annual International Conference on Computer Documentation*; 1997; pp. 23–26.

$L^2imbo$: *A Distributed Systems Platform for Mobile Computing*; Nigel Davies, Adrian Friday, Stephen P. Wade and Gordon S. Blair; *Mob. Netw. Appl.* 3,2 (Aug. 1998), pp. 143–156.

* cited by examiner

RADIO INTERFACE LAYER IN A CELL PHONE WITH A SET OF APIS HAVING A HARDWARE-INDEPENDENT PROXY LAYER AND A HARDWARE-SPECIFIC DRIVER LAYER

TECHNICAL FIELD

The invention generally relates to application programming interfaces (APIs) and, even more particularly, relates to a Radio Interface Layer comprising a set of APIs.

BACKGROUND

Cellular telephones are becoming commonplace in today's world. As users become more accustomed to using cellular telephones, they are requesting more sophisticated uses of telephones. Ideally, users would like their cellular telephones to perform the same functions as their personal computers or hand-held PDAs. Implementing such uses in a cellular telephone environment requires application developers to develop or adapt their software for use on a cellular telephone. However, adapting or developing software for use on one OEM's cellular telephone does not necessarily guarantee that the software application will function on another OEM's cellular telephone due to the different radio implementations of different OEMs and due to the differences in different cellular environments.

In order to create a software solution adaptable to multiple different cellular systems and radios, there is a need for some kind of a hardware adaptation layer, i.e. a layer that isolates the specifics of a particular cellular system/hardware from the bulk of the software system. There is a further need to expose a predefined interface used by the software components. There is still a further need that the layer should allow hardware manufacturers to replace/modify the implementation of the hardware interface to conform to their specific hardware.

Such a layer (TAPI) already exists for use in development of general telephony systems. However, TAPI has two disadvantages making it difficult to use in a cellular environment: a significant amount of cellular-specific functionality isn't exposed by the TAPI interface and TAPI Service Providers (TSPs) are quite difficult to implement, thus making it harder to adapt the software system to different types of hardware. Hence, there is a need for a new hardware adaptation layer which is more specifically suited to the cellular environment and which simplifies the task of adapting it to different types of hardware.

SUMMARY OF THE INVENTION

The present invention meets the above-described needs by providing a Radio Interface Layer (RIL), which is an API set providing a level of abstraction between the radio on a cell phone and the software of the cell phone. The API set of RIL is roughly based on the GSM AT interface as defined in GSM specifications 07.05 and 07.07. The API set provides access to functionality contained within a cellular telephone, such as a GSM or CDMA compatible telephone. The present invention allows applications running on an operating system in the cellular telephone to issue commands without knowledge of the underlying radio structure of the cellular telephone and without specific knowledge of the GSM-type commands. For example, the present invention allows the applications to access phonebook entries, restrict access to data and functionality using passwords, access file and message storage, and perform many other functions. The RIL is divided into a hardware-independent proxy layer, called by various software components, and a driver layer that is hardware-specific. It should be understood that an OEM may replace the driver layer with their own layer containing implementation specific to their hardware.

That the invention improves over the drawbacks of the prior art and accomplishes the advantages described above will become apparent from the following detailed description of the exemplary embodiments and the appended drawings and claims.

DETAILED DESCRIPTION OF EMBODIMENTS OF THE INVENTION

An embodiment of the present invention will be incorporated into a cellular telephone marketed by Microsoft Corporation of Redmond, Wash. The cellular telephone may be a "smart phone" that, in addition to providing telephony services, also runs different software applications and performs different functions normally reserved for personal computers or PDAs. For example, in one embodiment, the telephone may be used as a personal information manager (PIM) for storing appointments, contacts, tasks, etc.

Figure 1:
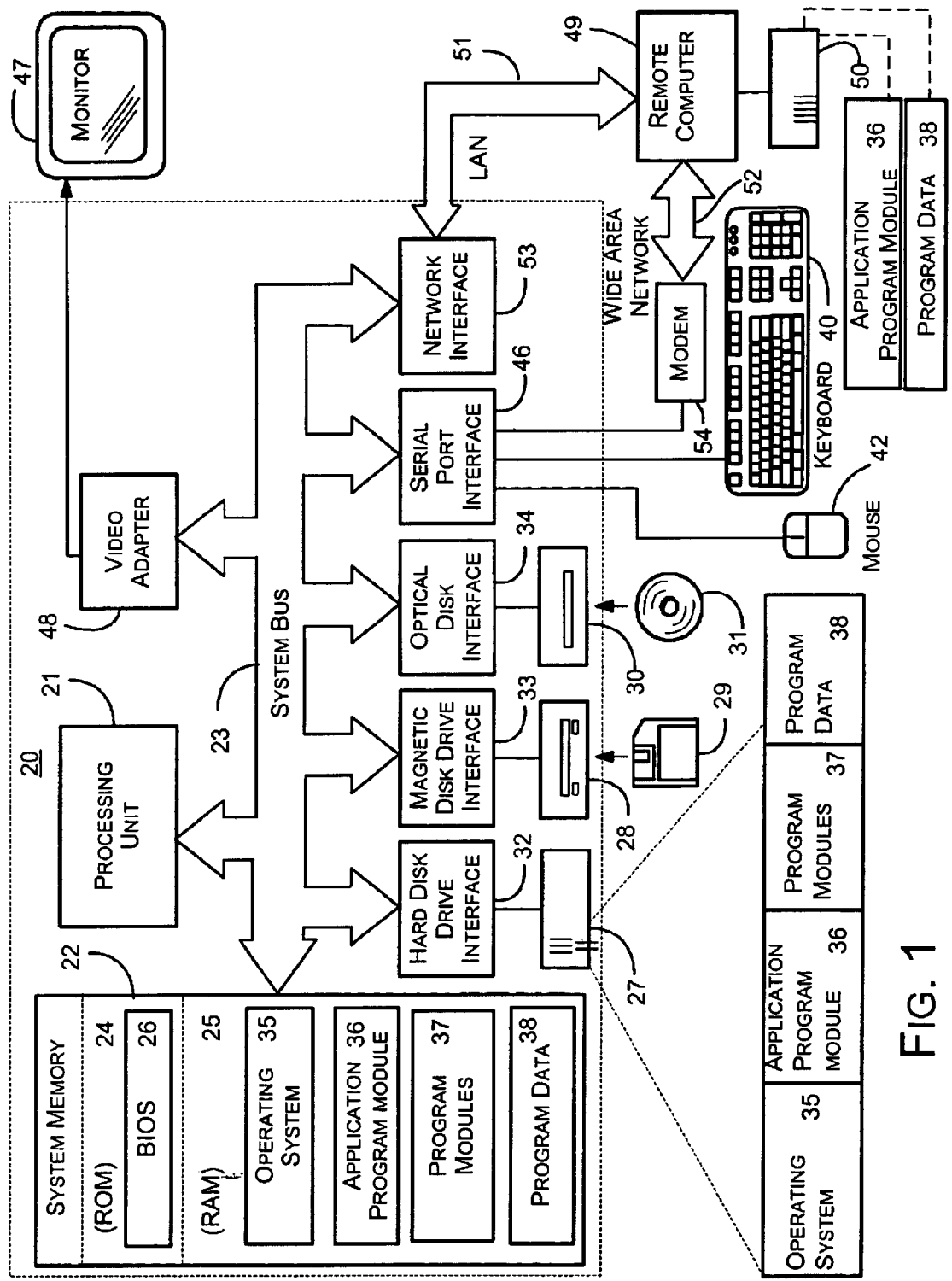
FIG. 1 is a block diagram of an exemplary personal computer system.

Other embodiments of the present invention may be incorporated into PDAs, personal computers and hand-held computers. FIG. 1 and the following discussion are intended to provide a brief, general description of an exemplary personal computer system for use with the above-described embodiments of the present invention. Those skilled in the art will recognize that software products may include routines, programs, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, software products may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. A video BIOS 60 may also be stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of software products may be stored in the drives and RAM 25, including an operating system 35, a software product 36, such as Microsoft's "OFFICE XP" suite of application program modules, other software products 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Radio Interface Layer

In one embodiment, the present invention, known as the Radio Interface Layer (RIL) comprises an API set which provides a level of abstraction between the radio on a cell phone and the software of the cell phone. The API set of RIL is based on the GSM AT interface as defined in GSM specifications 07.05 and 07.07. The API set provides access to functionality contained within a cellular telephone, such as a GSM or CDMA compatible telephone. The present invention allows applications running on an operating system in the cellular telephone to issue commands without knowledge of the underlying radio structure of the cellular telephone and specific knowledge of the GSM-type commands. For example, the present invention allows the applications to access phonebook entries, restrict access to data and functionality using passwords, access file and message storage, and perform many other functions.

The RIL is divided into a hardware-independent proxy layer, called by various software components, and a driver layer that is hardware-specific. It should be understood that an original equipment manufacturer (OEM) may replace the driver layer with their own layer containing implementation specific to their hardware. In a preferred embodiment, the RIL is a core component of a cellular telephone marketed by Microsoft Corporation of Redmond, Wash.

RIL Driver Layer

In a preferred embodiment, the Radio Interface Layer (RIL) driver layer is used to implement and roughly correspond to the commands, such as AT commands, specified by ETS 300 585, Digital cellular telecommunications system (Phase 2); Use of Data Terminal Equipment-Data Circuit terminating Equipment (DTE-DCE) interface for Short Messaging Service (SMS) and Cell Broadcast Service (CBS) (GSM 07.05), Fifth Edition, April 1997, and ETS 300 642, Digital cellular telecommunications system (Phase 2); AT command set for GSM Mobile Equipment (ME) (GSM 07.07 version 4.4.1), Fourth Edition, March 1999. The GSM specifications 07.05 and 07.07 are hereby incorporated by reference. Of course, the RIL driver may be used to implement and correspond to other command sets, such as CDMA commands, or a combination of several command sets.

OEMs may use the RIL driver of the preferred embodiment or tweak it if they would rather talk with their radio over private APIs instead of via AT commands (most likely for performance reasons).

Generally described, the RIL driver layer receives an RIL API call and causes the radio (i.e. the receiver/transmitter of the cellphone, PDA, etc.) to perform the function defined by the RIL API. In a preferred embodiment, the RIL driver will receive the RIL API call from a RIL proxy layer (described below). The RIL driver layer also processes notifications received from the radio and transmits them to the RIL proxy layer. In a preferred embodiment, the RIL driver layer is a dynamic link library (DLL) that is running as a device driver inside the process space of a device manager (the standard module that manages device drivers on the "WINDOWS CE" operating system). A Device Manager (device.exe) may be responsible for managing all the system drivers, including the RIL driver.

RIL Proxy Layer

In one embodiment, the RIL proxy layer comprises a layer that is called by various other layers of the core architecture, such as a TSP layer, an ExTAPI layer, and a SIM Manager using the platform specific commands of these core architectures. In a preferred embodiment, the proxy layer is a "WINDOWS CE" dynamic link library (DLL) that manages callback notifications and inter-process function calls into the RIL driver layer. Modules that want to use the RIL simply link with this proxy DLL. The RIL proxy layer converts the core architecture specific commands into RIL API calls that will be understood by the RIL driver layer.

There are some important distinctions between the proxy and driver layers. In a preferred embodiment of the invention, a separate proxy instance is created for each module using the RIL proxy DLL. On the other hand, in a preferred embodiment of the invention, the RIL device driver is loaded only once and is shared amongst all proxy layer instances. In other words, a module using the RIL must be aware that only one radio module exists, even though it links to its own proxy DLL. In addition, the Device Manager's control of the RIL driver implies that the proxy and driver live in separate processes (i.e. different address spaces). However, the "WINDOWS CE" operating system exposes mechanisms allowing the proxy and driver layers to communicate without being concerned with the process boundaries.

Another important architectural property of the RIL is that almost all of the functions are asynchronous. When a module first registers with the RIL, it passes in two callback functions. One is used for unsolicited notifications, and the other is used for responses to function calls. For instance, when the phone receives a new incoming call, RIL will use the unsolicited notification callback to let each module know about the incoming call. Alternately, when a module calls RIL to obtain the signal strength, the function call immediately returns a response identifier. Shortly thereafter, RIL uses the function response callback to convey signal strength information to the module. To ensure that function response callbacks are correctly matched up with function calls, this callback structure also contains the same response identifier value returned by the original function call. This asynchronous architecture simplifies RIL implementation. If a module needs to call RIL functions in a synchronous manner, it will need to make the function call and block until it receives the function response callback.

Another architectural feature of the RIL is a virtual serial port (VSP). When an application makes a data connection, it retrieves a handle to a virtual serial port (not the real data stream between the RIL and the radio). This allows RIL to buffer and flow control the data stream so that control commands can be interjected. For example, suppose an application has set up a data connection and is browsing on the Internet. The virtual serial port allows RIL to interject control commands to check for things like signal strength, new SMS messages, etc. However, further suppose an application is receiving a facsimile. Due to strict timing issues in the case of a facsimile transmission, the RIL will enter a dedicated data mode where the application has full control of the virtual serial port. That is, RIL will not attempt to interject any commands in the data stream. It should be understood that the VSP is similar to other communication ports and typically only one application can have the handle to the VSP at one time.

Figure 2:
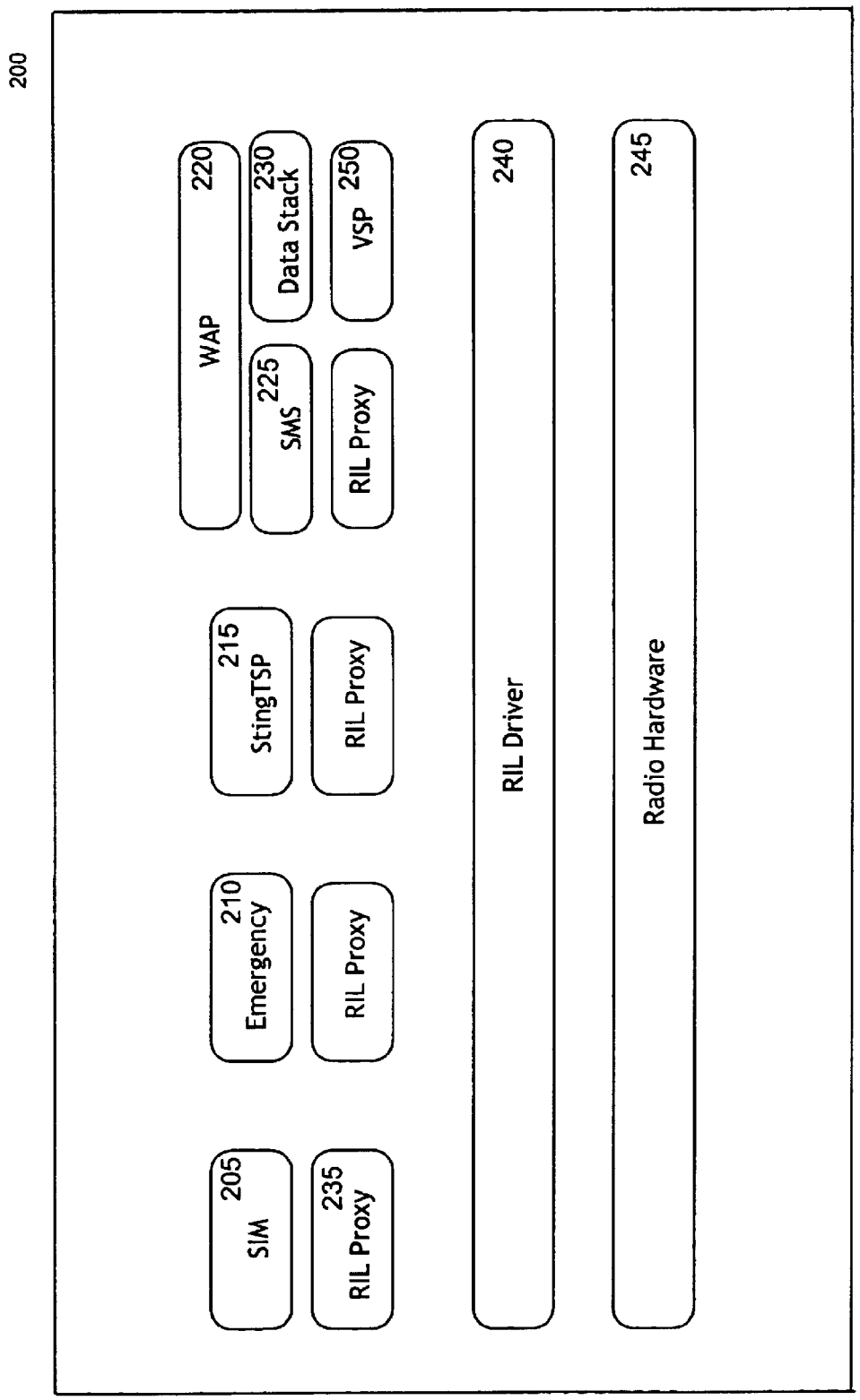
FIG. 2 is a block diagram illustrating an exemplary embodiment of an RIL in a phone in accordance with an embodiment of the present invention.

Referring now to FIG. 2, a block diagram illustrating an exemplary embodiment of an RIL in a cellphone 200 in accordance with an embodiment of the present invention will be described. The cellphone 200 comprises a SIM manager 205, an emergency application 210, a TAPI Service Provider (TSP) 215, a WAP layer 220, a SMS manager 225, a data stack 230 and a VSP 250.

The cellphone 200 further comprises a plurality of instances of the RIL proxy layer 235. The RIL proxy layer 235 provides communications between applications (such as the SIM manager 205, emergency application 210, TSP 215, WAP layer 220, SMS manager 225, and ExTAPI, among others) and a RIL driver layer 240. The RIL driver layer 240 provides communications between the RIL proxy layer and the radio hardware 245.

Scenarios

In terms of "using" the RIL (from the point of view of both an application designer and an OEM), the proxy and driver layers each expose a set of functions. For a program module to use the RIL, it only needs to use functions specified in the proxy header file and then link with the proxy DLL. The proxy DLL is implemented by calling functions specified in the driver header file. The driver header file is provided to OEMs and defines the functions that an OEM must implement. In one embodiment, the implementation will be hardware specific, so each OEM will be responsible for its own driver implementation. However, one or more reference implementations of the driver (source code included) may be provided to OEMs to help them with this step. If an OEM uses radio hardware that is supported by one of these reference implementations, it may not need to revise the RIL code.

Method for Processing Commands Using RIL

Figure 3:
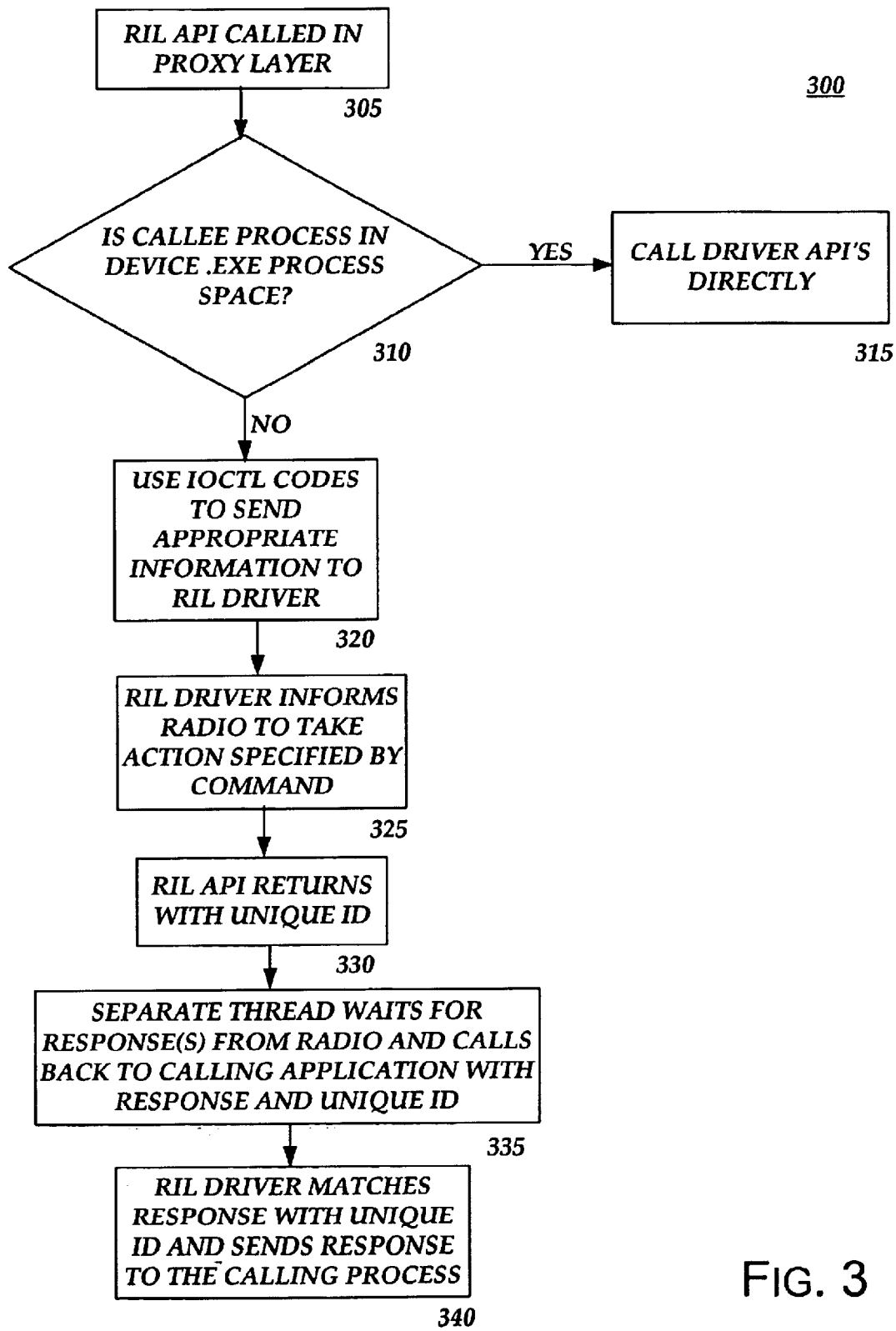
FIG. 3 is a flow diagram illustrating a method for processing of commands using the radio interface layer (RIL) in accordance with an embodiment of the present invention.

FIG. 3 is a flow diagram illustrating a method 300 for processing of commands using the radio interface layer (RIL) in accordance with an embodiment of the present invention. The method 300 begins at step 305 when a user calls a RIL API in the proxy layer.

At decision step 310, it is determined whether the callee, i.e. the called process, is in the device.exe process space. If it is, then the method proceeds to step 315 where the driver APIs are called directly. If it is determined at decision step 310 that the callee is not in the device.exe process space then the method proceeds to step 320.

At step 320, input/output control (IOCTL) codes are used to send the appropriate information for the RIL API to the RIL driver running in a separate process space. At step 325, the RIL driver informs the radio to take the action specified by the command of the RIL API. In a preferred embodiment, the RIL driver informs the radio to take action using an AT command interface, as defined in GSM specs (most prominently 07.05 and 07.07). However, sending AT commands may not be ideal for a given radio—perhaps an OEM has a separate private API set that they can use to perform the same functionality as a given AT command. If this is the case, the OEM may change the RIL driver to suit their needs. However, in a preferred embodiment, because the core architecture of the phone has been built on top of a set of RIL APIs that may be implemented via AT commands, it is not necessary for the OEM to substantially modify the RIL driver so long as the radio understands AT commands. However, due to different implementations of the AT interface, some minor modifications may be necessary.

The method then proceeds to step 330 where the RIL API returns with a unique ID generated by the RIL. It should be understood that after sending an AT command, a response from the radio unit is awaited. RIL APIs are designed to be asynchronous, so these APIs will return immediately, with a unique ID assigned to the call.

The method then proceeds to step 335 where a separate thread waits for responses from the radio unit.

The method then proceeds to step 340 where the RIL driver matches the response from the radio unit with the unique ID generated earlier and the RIL driver sends the response to the appropriate calling process via a callback function.

It should also be understood that radio units can also send unsolicited notifications (for example, when the phone switches cellular towers). In this case, the RIL driver receives a notification from the radio and will broadcast a message to all users of the RIL layer who are interested in this class of notification.

For an example illustrating an implementation of method 300, consider the following: the API RIL_ChangeLockingPassword is a RIL API that allows changing the password of a phone for various lock facilities. This API is modeled after the+CPWD AT command, defined in section 7.5 of GSM 07.07. The AT command to change a password requires a lock facility, the old password, and the new password. Accordingly, the API for RIL_ChangeLockingPassword appears as:

HRESULT RIL_ChangeLockingPassword(
HRIL hRil,
DWORD dwFacility,
LPCSTR lpszOldPassword,
LPCSTR lpszNewPassword
);

When the user application wants to change the locking password, it calls this API, typically indirectly via a TAPI layer or another layer. For example, the application may understand the TAPI command for changing a password and send this command to the TAPI layer. The TAPI layer will then make the appropriate RIL API call to the proxy layer. As part of the RIL API, a RIL handle must be provided (which is obtained from initializing RIL), a locking facility must be provided, the old password must be provided and the new password must be provided. For example, suppose a user application wishes to change the password used to lock the SIM card from "1234" to "5678". The user application (or an intermediate layer such as the TAPI layer) would make the following API call:

RIL_ChangeLockingPassword(hRIL, RIL_LOCKFACILITY_SIM, "1234", "5678");

If the calling process is not in the device.exe, these parameters will get bundled into a structure and passed via an IOCTL call, RIL_IOCTL_CHANGELOCKINGPASSWORD:

```
typedef struct changelockingpassword_params_tag {
    DWORD dwfacility;
    char szOldPassword[MAXLENGTH_PASSWORD];
    char szNewPassword[MAXLENGTH_PASSWORD];
}
```

CHANGELOCKINGPASSWORD_PARAMS, *LPCHANGELOCKINGPA SSOWRD_PARAMS;

The RIL driver will then take these constants and generate an AT command string as specified in GSM 07.07:

AT+CPWD=SC,1234,5678

Note that if an OEM were to change the RIL driver to call a private API to their radio instead of using an AT command, they would make their change at this point.

After sending this AT command (or private API) to the radio, the RIL driver returns, and RIL_ChangeLockingPassword returns. The radio has not yet processed the command at this point, so a unique ID is givenback to the user as the return value of this RIL API.

After processing the command, the radio module will return a success or error code (in this case, there will be a success code or a possibly descriptive error code such as "wrong password"). The radio gives this response to the RIL driver, which has a separate thread waiting for responses from the radio module. This response is then matched with the unique ID from the API call and sent via a callback function to the calling process. The calling process can then note whether the locking password was successfully changed or not and act accordingly.

Figure 4:
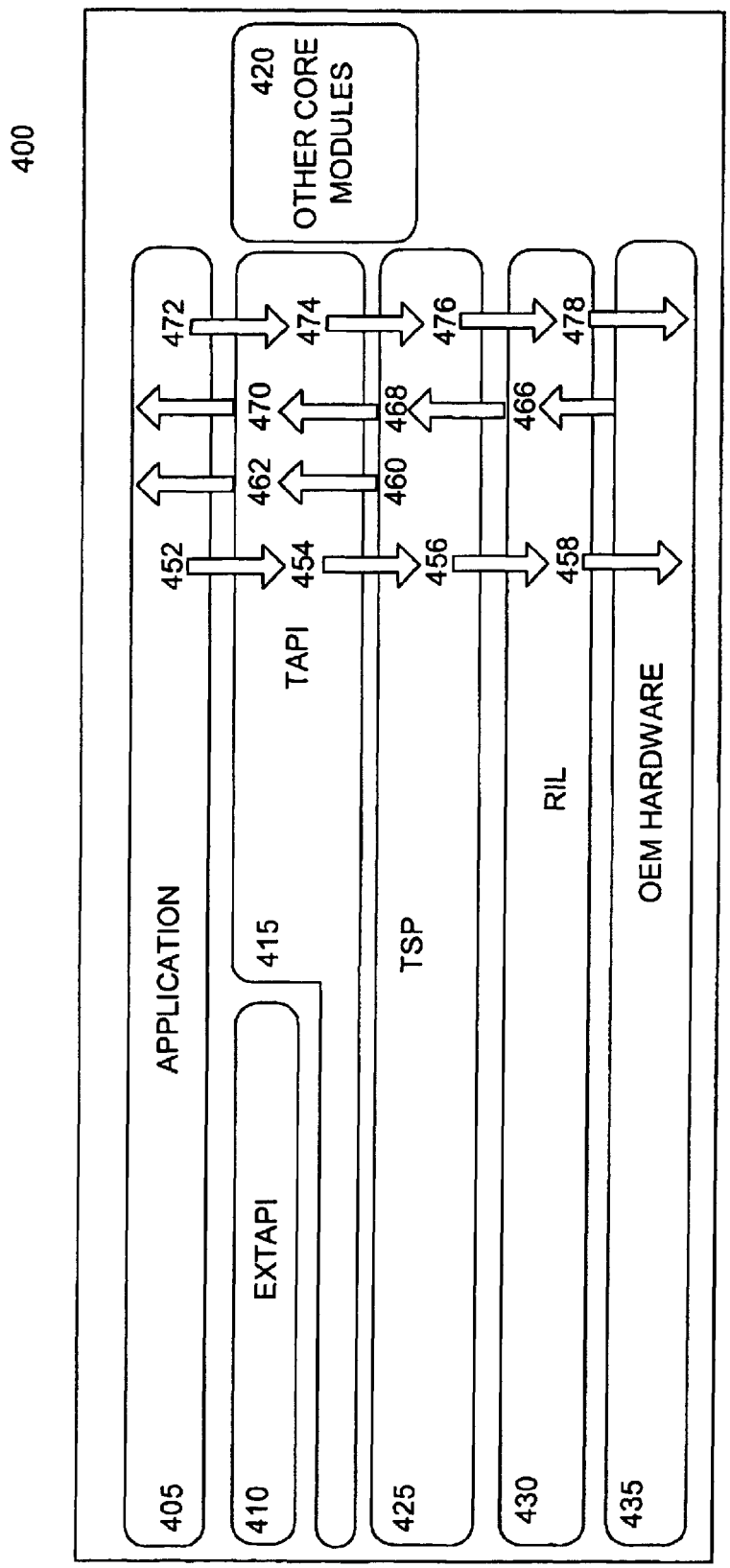
FIG. 4 is a block diagram illustrating a method for an application to establish a voice call using RIL in accordance with an embodiment of the present invention.

Referring now to FIG. 4, an example illustrating a method for an application to establish a voice call using RIL in accordance with an embodiment of the present invention will be described. It should be understood that establishing a voice call is only one of many functions that may be performed using the RIL APIs. The method outlined in FIG. 4 is illustrative of one of these functions (establishing a voice call). The method is implemented in telephone 400 that includes an application layer 405, an ExTAPI layer 410, a TAPI layer 415, other core modules 420, a TSP 425, a radio interface layer (RIL) 430 in accordance with an embodiment of the invention, and OEM hardware 435. It should be understood that the method does not describe the IOCTLs which will be understood by those skilled in the art to be present in a preferred embodiment. It should be further understood that the present invention may be implemented without the use of IOCTLs.

The method begins when application 405 calls the TAPI function: lineMakeCall (step 452). The TAPI layer 415 calls the TSP 425 with the following function call: TSPI_lineMakeCall (step 454). The TSP 425 calls the RIL with the following RIL function: RIL_Dial (step 456). The RIL initiates the phone call by sending the corresponding command to the OEM hardware (e.g. radio): e.g. ATDT 555–1234 (step 458). The TSP returns asynchronously a reply message to the TAPI layer indicating that the call has been initiated: LINE_REPLY message (step 460).

The TAPI layer forwards the reply message (LINE_REPLY) to the application (step 462). When the OEM hardware detects that a connection to the number has been made, then it sends a CONNECT response to the RIL (step 464). The RIL sends a message (RIL_NOTIFY_CONNECT) to the TSP indicating that a connection has been made (step 466). The TSP sends a state change message (LINE_CALLSTATE) to the TAPI layer (step 468). The TAPI layer forwards the state change message (LINE_CALLSTATE) to the application 405 (step 470).

When the application 405 wishes to drop the telephone call, it calls the TAPI layer with a hang-up request: (lineDrop) (step 472). The TAPI layer forwards the TSP the hang-up request: (TSPI_lineDrop) (step 474). The TSP handler passes the hang-up request to the RIL: (RIL_Hangup) (step 476). The RIL passes the hang-up request to the OEM hardware (e.g. ATH) (step 478).

Features

The following table describes some of the features that may be implemented using an embodiment of the present invention and a brief description of these features.

| Name | Description |
|---|---|
| Network Services | Operator selection, signal status, available operators, etc. |
| Call Control | Dial, Hangup, Hold, Transfer, etc. |
| Supplemental Services | Call waiting, call forwarding, call meter, etc. |
| SMS | Send, receive, SMSC selection, etc. |
| Data Connection | Virtual serial port, bearer service types, transparent data/online mode change |
| Security Functions | Locking, unlocking, passwords, etc. |
| Interface Functions | Initialization, notification registration, etc. |
| Phonebook Functions | Accessing the SIM phonebooks |
| SIM SMS Functions | Accessing SMS messages from the SIM |
| GPRS Functions | Selecting profiles, attaching, activating, etc. |
| HSCSD Functions | Managing channel allocations |
| SIM Record Access | Access individual files on the SIM |
| SIM Toolkit 2.0 Support | Engaging in a SIM toolkit session |

Structure Listing

This section describes the "data structures" passed as parameters to some RIL APIs and returned with some RIL notifications in an embodiment of the present invention.

| Structure | Comments |
|---|---|
| Network Service Structures | |
| RILSUBSCRIBERINFO | Defines an assigned phone number and parameter associated with it |
| RILOPERATORNAMES | Defines the long, short, and numeric format of a single operator |
| RILOPERATORINFO | Defines a network operator |
| Call Control Structures | |
| RILCALLINFO | Defines each call instance (active, on hold, in conference, etc.) |
| RILRINGINFO | Indicates the type of incoming call |
| Supplemental Service Structures | |
| RILCALLFORWARDSETTINGS | Defines call forwarding |
| RILCALLWAITINGINFO | Information about an incoming call |
| RILCALLERIDSETTINGS | Defines caller ID |
| RILHIDEIDSETTINGS | Defines how to hide your phone number when calling someone else |
| RILDIALEDIDSETTINGS | Defines the true number that was dialed |
| RILCLOSEDGROUPSETTINGS | Defines closed user group settings |
| RILREMOTEPARTYINFO | Structure used for CallerID and DialedID notifications |
| Voice Structures | |
| RILGAININFO | Defines audio gain for the transmit and receive channels |
| RILAUDIODEVICEINFO | Defines transmit and receive audio devices |
| Messaging Structures | |
| RILMSGSERVICEINFO | Messaging settings such as storage locations and usage info |
| RILMSGDCS | Data coding scheme |
| RILMSGCONFIG | Messaging configuration |
| RILMESSAGE | An actual message |
| RILMESSAGEINFO | Contains an RILMESSAGE along with additional info |
| RILMSGSTORAGEINFO | Information about a message storage location |
| Data Service Structures | |
| RILCALLHSCSDINFO | Defines HSCSD parameters for the current call |
| RILHSCSDINFO | Defines HSCSD parameters |
| RILDATACOMPINFO | Defines parameters for data compression |
| RILERRORCORRECTIONINFO | Defines parameters for error correction |
| RILBEARERSVCINFO | Defines the current data communication settings |
| RILRLPINFO | Defines Radio Link Protocol (RLP) parameters for non-transparent data calls |
| RILCONNECTINFO | Defines connect information on a data call |
| RILSERIALPORTSTATS | Defines statistics of the virtual serial port |
| RILSERVICEINFO | Defines parameters of the data connection |
| RILSUPSERVICEDATA | Defines elements of a USSD message |
| Capability Structures | |
| RILCAPSBEARERSVC | Bearer service capabilities |
| RILCAPSDIALSVC | Dial capabilities |
| RILCAPSHSCSD | HSCSD capabilities |
| RILCAPSLOCKINGPWDLENGTH | Locking password length capabilities |
| RILCAPSMSGMEMORYLOCATIONS | Message storage location capabilities |
| RILCAPSRLP | RLP capabilities |
| SIM Toolkit Structures | |
| RILSIMCMDPARAMETERS | Elements of a SIM command |
| RILSIMRESPONSE | Elements of a SIM command response |
| Miscellaneous Structures | |
| RILEQUIPMENTINFO | Defines miscellaneous (generally static) properties of radio module |
| RILPHONEBOOKINFO | Defines the state of the phonebook |
| RILPHONEBOOKENTRY | Defines an entry in the phonebook |
| RILCOSTINFO | Defines cost information for the current operator's rate |
| RILSIGNALQUALITY | Defines the current signal quality |
| RILADDRESS | A phone number |
| RILSUBADDRESS | More detailed information about a phone number |
| RILCELLTOWERINFO | Information about the currently registered cell tower |
| RILRANGE | Defines a min/max range |

Notification Listing

This section lists some of the unsolicited RIL notifications that get passed to the notification callback. Note that these notifications differ from the ones passed to the response callback as responses to earlier issued function calls. These notifications have been categorized for convenience. These notifications are in one embodiment of the invention and are not meant to limit the invention. dwCode is the numeric ID identifying the notification and lpData is the additional data returned with the notification.

| DwCode | lpData | Comments |
|---|---|---|
| RIL_NOTIFY_REGSTATUS CHANGED | ( RIL_REGSTAT_ * ) Constant | Sent with change in registration status |
| RIL_NOTIFY_CALLMETER | dwNewCallMeter | Call meter has changed |
| RIL_NOTIFY_CALLMETER MAXREACHED | <NULL> | Maximum call meter has been reached |
| Call Control Notifications | | |
| RIL_NOTIFY_RING | RILRINGINFO Structure | Incoming call |
| RIL_NOTIFY_CONNECT | RILCONNECTINFO Structure | Call connected |
| RIL_NOTIFY_DISCONNECT | RIL_DISCINIT_* Constant | Call disconnected |
| RIL_NOTIFY_DATASVC NEGOTIATED | RILSERVICEINFO Structure | Data call service has been negotiated |
| RIL_NOTIFY_CALLSTATE CHANGED | <NULL> | Call state of one or more calls may have changed |
| RIL_NOTIFY_EMERGENCY MODEENTERED | <NULL> | RIL has entered emergency mode |
| RIL_NOTIFY_EMERGENCY MODEEXITED | <NULL> | RIL has exited emergency mode |
| RIL_NOTIFY_EMERGENCY HANGUP | <NULL> | Existing calls (if any) were hung up for emergency mode |
| RIL_NOTIFY_HSCSDPARAMS NEGOTIATED | RILCALLHSCSDINFO Structure | HSCSD parameters for a call have been negotiated |
| Supplemental Service Notifications | | |
| RIL_NOTIFY_CALLERID | ( RILREMOTEPARTYINFO * ) | The remote address of the incoming call |
| RIL_NOTIFY_DIALEDID | ( RILREMOTEPARTYINFO * ) | The destination address of the outgoing call |
| RIL_NOTIFY_CALLWAITING | ( RILCALLWAITINGINFO * ) | Call waiting notification |
| RIL_NOTIFY_SUPSERVICE DATA | ( RILSUPSERVICEDATA* ) | Incoming USSD message |
| Messaging Notifications | | |
| RIL_NOTIFY_MESSAGE | ( RILMESSAGE * ) | Indicates a new message |
| RIL_NOTIFY_BCMESSAGE | ( RILMESSAGE * ) | Indicates a new broadcast message |
| RIL_NOTIFY_STATUS MESSAGE | ( RILMESSAGE * ) | Indicates a new status message |
| RIL_NOTIFY_MSGSTORED | ( dwIndex ) | Indicates a message has been stored |
| RIL_NOTIFY_MSGDELETED | ( dwIndex ) | Indicates a message has been deleted |
| RIL_NOTIFY_MSGSTORAGE CHANGED | RILMSGSTORAGEINFO Structure | One of the message storage locations has been changed |
| Phonebook Notifications | | |
| RIL_NOTIFY_PHONEBOOK ENTRYSTORED | dwIndex | Phonebook entry has been added |
| RIL_NOTIFY_PHONEBOOK ENTRYDELETED | dwIndex | Phonebook entry has been deleted |
| RIL_NOTIFY_PHONEBOOK STORAGECHANGED | (RIL_PBLOC *) Constant | Phonebook storage location has been changed |

-continued

| DwCode | IpData | Comments |
|---|---|---|
| SIM Toolkit Notifications | | |
| RIL_NOTIFY_SIMTOOLKIT CMD | dwByteCount | Proactive SIM command received |
| RIL_NOTIFY_SIMTOOLKIT CALLSETUP | dwRedialTimeout | Proactive SIM command to setup a call |
| RIL_NOTIFY_SIMTOOLKIT EVENT | dwByteCount | Toolkit command was handled by the radio or radio sent a toolkit response to the SIM |
| Miscellaneous Notifications | | |
| RIL_NOTIFY_SMSNOT ACCESSIBLE | <NULL> | Sim has been removed or has failed to respond |
| RIL_NOTIFY_DTMFSIGNAL | ( char* ) | A DTMF signal has been detected |

Function Listing

This section lists some of the RIL functions broken down by group. Each entry denotes the function name, and a brief description. Where applicable, the corresponding GSM AT command is included.

| Function | GSM | Comments |
|---|---|---|
| Network Service Functions | | |
| RIL_GetSubscriberNumbers | +CNUM | Gets list of assigned phone numbers |
| RIL_GetOperatorList | +COPS | Gets a list of available operators |
| RIL_GetPreferredOperatorList | +CPOL | Gets a list of preferred operators |
| RIL_AddPreferredOperator | +CPOL | Adds to the list of preferred operators |
| RIL_RemovePreferredOperator | +CPOL | Removes from the list of preferred operators |
| RIL_GetCurrentOperator | +COPS | Gets the operator currently registered |
| RIL_RegisterOnNetwork | +COPS | Register with a particular operator |
| RIL_UnregisterFromNetwork | +COPS | Unregister current operator |
| RIL_GetRegistrationStatus | +CREG | Gets registration status |
| Call Control Functions | | |
| RIL_Dial | D +FCLASS | Dials a number |
| RIL_Answer | A | Answers an incoming call |
| RIL_Hangup | H | Sets operator information |
| RIL_SendDTMF | +VTS | Sends DTMF tones (e.g. during a call) |
| RIL_GetDTMFDuration | +VTD | Gets tone duration options |
| RIL_SetDTMFDuration | +VTD | Sets tone duration options |
| RIL_SetDTMFMonitoring | | Turns on/off DTMF monitoring |

-continued

| Function | GSM | Comments |
|---|---|---|
| RIL_GetCallList | +CLCC | Retrieves list of active calls and their status |
| RIL_ManageCalls | +CHLD | Changes call status (hold, conference, etc) |
| RIL_TransferCall | +CTFR | Explicitly transfers a call |
| RIL_GetLineStatus | +CPAS | Gets line status |
| Supplemental Service Functions | | |
| RIL_SetCallerIDSettings | +CLIP | CallerID settings |
| RIL_GetHideIDSettings | +CLIR | Hides own number from recipient |
| RIL_SetHideIDStatus | +CLIR | Hides own number from recipient |
| RIL_GetDialedIDSettings | +COLP | Dialed number on an outgoing call |
| RIL_SetDialedIDSettings | +COLP | Dialed number on an outgoing call |
| RIL_GetClosedGroupSettings | +CCUG | Closed user group settings |
| RIL_SetClosedGroupSettings | +CCUG | Closed user group settings |
| RIL_GetCallForwardSettings | +CCFC | Call forward settings |
| RIL_AddCallForwarding | +CCFC | Add a number to the call forwarding list |
| RIL_RemoveCallForwarding | +CCFC | Remove a number from the call forwarding list |
| RIL_SetCallForwardStatus | +CCFC | Enable/disable call forwarding |
| RIL_GetCallWaitingSettings | +CCWA | Call waiting settings |
| RIL_SetCallWaitingStatus | +CCWA | Call waiting settings |
| Voice Functions | | |
| RIL_GetAudioGain | +VGR +VGT | Gets receive gain of the audio device |
| RIL_SetAudioGain | +VGR +VGT | Sets receive gain of the audio device |
| RIL_GetAudioDevices | +VGS | List connected audio devices (mic, speaker, etc) |
| RIL_SetAudioDevices | +VGS | Sets connected audio devices (mic, speaker, etc) |
| RIL_GetAudioMuting | +CMUT | Gets muting state |
| RIL_SetAudioMuting | +CMUT | Sets muting state |
| Messaging Functions | | |
| RIL_GetMsgServiceOptions | +CSMS +CPMS +CMGF +CESP | Gets messaging service options |
| RIL_SetMsgServiceOptions | +CSMS +CPMS +CMGF +CESP | Sets messaging service options |
| RIL_GetMsgConfig | +CSCA +CSMP +CSDH +CSCB | Gets message configuration options |
| RIL_SetMsgConfig | +CSCA +CSMP +CSDH +CSCB | Sets message configuration options |
| RIL_RestoreMsgConifg | +CRES | Restores messaging settings |
| RIL_SaveMsgConfig | +CSAS | Saves messaging settings |
| RIL_GetMsgList | +CMGL | Lists all messages |
| RIL_ReadMsg | +CMGR +CMGD | Read (optionally delete) a message |
| RIL_DeleteMsg | +CMGD | Delete a message |
| RIL_WriteMsg | +CMGW +CMGS +CMMS | Writes (optionally send) a message |

| Function | GSM | Comments |
|---|---|---|
| RIL_SendMsg | +CMGS +CMSS +CMMS | Send a message |
| RIL_SendStoredMsg | +CMGS +CMSS +CMMS | Send a message from a storage location |
| RIL_SendMsgAcknowledgement | +CMGS +CMSS +CMMS | Send a message ACK when requested by an incoming message |
| Data Service Functions | | |
| RIL_GetSerialPortHandle | | Gets a virtual serial port handle |
| RIL_GetSerialPortStatistics | | Gets statistics on the virtual serial port handle |
| RIL_GetHSCSDOptions | +CHSD +CHDT +CHSN +CHSC +CHSR | Get settings for circuit switched data calls |
| RIL_SetHSCSDOptions | +CHSD +CHDT +CHSN +CHSC +CHSR | Set settings for circuit switched data calls |
| RIL_GetDataCompression | +DS | Gets data compression options |
| RIL_SetDataCompression | +DS | Sets data compression options |
| RIL_GetErrorCorrection | +EX | Gets error correction options |
| RIL_SetErrorCorrection | +EX | Sets error correction options |
| RIL_GetBearerServiceOptions | | |
| RIL_SetBearerServiceOptions | | |
| RIL_GetRLPOptions | | Gets radio link protocol options |
| RIL_SetRLPOptions | | Sets radio link protocol options |
| RIL_CancelSupServiceDataSession | +CUSD | Cancel a USSD session |
| RIL_SendSupServiceData | +CUSD | Send a USSD message |
| Security Functions | | |
| RIL_GetUserIdentity | +CIMI | Retrieve the customer's mobile identity |
| RIL_UnlockPhone | +CPIN | Sends a pending password |
| RIL_ChangeCallBarringPassword | +CPIN +CPWD | Changes the call barring password |
| RIL_ChangeLockingPassword | +CPIN +CPWD | Changes the locking password |
| RIL_GetPhoneLockedState | +CPIN | Gets phone lock status |
| RIL_GetCallBarringStatus | +CLCK | Gets call barring status |
| RIL_SetCallBarringStatus | +CLCK | Sets call barring status |
| RIL_GetLockingStatus | +CLCK | Gets locking status |
| RIL_SetLockingStatus | +CLCK | Sets locking status |
| Interface Functions | | |
| RIL_Initialize | | Registers RIL proxy with RIL driver |
| RIL_Deinitialize | | Unregisters RIL proxy from RIL driver |

-continued

| Function | GSM | Comments |
|---|---|---|
| RIL_InitializeEmergency | | Registers an emergency application |
| RIL_DeinitializeEmergency | | Unregisters an emergency application |
| RIL_EnableNotifications | | Sets which notification classes to receive |
| RIL_DisableNotifications | | Disables notification classes from being sent |
| Phonebook Functions | | |
| RIL_GetPhonebookOptions | +CPBS | Gets the phonebook options |
| RIL_SetPhonebookOptions | +CPBS | Sets the phonebook location |
| RIL_DeletePhonebookEntry | +CPBW | Deletes a phonebook entry |
| RIL_ReadPhonebookEntries | +CPBR | Get phonebook entry |
| RIL_WritePhonebookEntry | +CPBW | Writes a phonebook entry |
| SIM Toolkit Functions | | |
| RIL_FetchSimToolkitCmd | +CSIM | Retrieves a proactive toolkit command |
| RIL_GetSimToolkitProfile | | Retrieves a current profile for a profile download |
| RIL_SetSimToolkitProfile | | Sets current profile for a profile download |
| RIL_SendSimToolkitCmdResponse | +CSIM | Sends a response to a proactive toolkit command |
| RIL_SendSimToolkitEnvelopeCmd | +CSIM | Sends an envelope command to the SIM |
| RIL_TerminateSimToolkitSession | +CSIM | Terminates a toolkit session |
| Miscellaneous Functions | | |
| RIL_GetEquipmentInfo | +CGMI GMI +CGMM GMM +CGMR GMR +CGSN GSN | Retrieves information about the phone equipment |
| RIL_GetEquipmentState | +CFUN | Manages phone state (power management) |
| RIL_SetEquipmentState | +CFUN | Manages phone state (power management) |
| RIL_SendSimCmd | +CSIM | Sends unrestricted commands directly to a SIM |
| RIL_SendRestrictedSimCmd | +CRSM | Sends a restricted set of commands directly to a SIM |
| RIL_ResetTerminal | Z & F | Resets all terminal parameters to defaults |
| RIL_GetCostInfo | +CAOC +CPUC | Retrieves advice of charge information |
| RIL_SetCostInfo | +CAOC +CPUC | Sets advice of charge information |

-continued

| Function | GSM | Comments |
| --- | --- | --- |
| RIL_GetSignalQuality | +CSQ | Gets signal quality |
| RIL_GetDevCaps | | Retrieves the capabilities of the radio device |
| RIL_DevSpecific | | Developer specific command |
| RIL_GetCellTowerInfo | +CREG | Gets info about the currently used cell tower |

It should be understood from the foregoing description that the RIL proxy layer is hardware-independent. In contrast, it should be understood that in different embodiments, the RIL driver layer is hardware-specific. However, in one embodiment, a sample GSM implementation of the RIL driver is provided to function with generic GSM hardware (although, in practice, some modifications will probably be needed for almost any GSM system currently in existence because the GSM specifications may be interpreted and implemented slightly differently by different OEMs).

It should be also understood from the foregoing description, that the present invention allows software applications to function on RIL-compatible phones independently of the hardware or the cellular network being used. For example, changing from a GSM to a CDMA network would only require replacing the RIL driver layer and the rest of the phone would work as it did in the GSM network.

It should be understood from the foregoing description that the purpose of the RIL is to provide access to cellular functionality for any component in the phone, PDA, etc. Without the RIL, each component (TAPI, SIM manager, SMS manager, etc.) of the phone would have to understand how to communicate to the radio directly. Because it would be difficult for hardware manufacturers to implement a TAPI driver, a SMS driver, a SIM driver, etc., the RIL was created to sit between the radio and the TAPI driver, the SMS driver, the SIM driver, etc.

It should be also be understood from the foregoing description, that because the RIL proxy is hardware-independent, RIL provides a platform for third party software developers. With the well-designed APIs and interfaces of the RIL of the present invention, a third party software developer may write his code once and have it work on all devices containing an implementation of RIL, such as telephones, PDAs, etc. Moreover, the software developer may use the well-defined telephony commands such as TAPI without worrying about whether the underlying device is using cellular technology, voice over IP, etc.

It should be understood that one of the objectives of RIL is to ease the integration process of software components with an OEM's hardware components. To realize this, a single layer handles all communication between the core modules and an OEM's radio hardware. The single RIL allows software components to be designed without having to worry about differences in underlying hardware. It also allows OEMs to integrate the software components with their radio hardware by implementing a single set of functions.

It should be understood that the foregoing description includes many implementation details that should not limit the scope of the present invention. For example, instead of using a proxy layer and a driver layer, the present invention may be implemented as a single abstraction layer between a telephony radio and a computer. The applications on the computer may communicate with the abstraction layer using top-level APIs. On the other hand, the telephony radio would respond to commands received from the abstraction layer. Because the difficulties of implementing specific modules to understand different protocols such as TAPI, ExTAPI, SMS, etc. is accomplished by the RIL itself, the present invention eases the implementation difficulties radio manufacturers often have. Moreover, radio manufacturers no longer have to worry about receiving and keeping track of calls from multiple client applications because all of these functions are handled by the RIL. Software application developers do not need to worry about the underlying hardware of a mobile device. Software applications may be easily written to work with RIL because the applications use well-known top-level APIs which are sent to the RIL. The RIL will then perform appropriate processing of these top-level APIs and, if necessary, send the appropriate command to the radio to perform a specific action.

Other Supported Configurations

It should also be understood from the foregoing description, that the present invention may be used with cellular telephones as well as other devices, such as handheld PDA devices. Some of these other devices may not have a permanent radio module(s). Certain changes known to those skilled in the art may be necessary to implement the invention in a device without a permanent radio module(s). Specifically, the invention must support Removable Compact Flash (CF)/PCMCIA radio modules that support circuit-switched cellular network connections.

Listed below are some possible device configurations:

Configuration 1: Cellular telephone

The device has a built in radio-module. It does not have any expansion slots that support CF or PCMCIA cards. Therefore the built-in radio module is guaranteed to be always present and no alternative form of cellular communications is permitted.

Configuration 2: PDA with PCMCIA/CF support

The device does not have a built in radio-module. However, it does contain a CF and/or PCMCIA expansion slot(s). In a preferred embodiment, the invention requires that a supported Radio module be inserted into the CF or PCMCIA slot.

Configuration 3: PDA with built in Radio and PCMCIA/CF support

The device has a built in radio module. It can be assumed that this radio module will always be present. Potentially, one can insert other devices (including radio modules) into any available expansion slot (PCMCIA, USB, Bluetooth, etc,).

The devices described above may also require a few additions and modifications to the API set as described below in an illustrative embodiment:
PDA Support API additions
Error Codes:
RIL_E_RADIONOTPRESENT
 Fails the RIL calls because there isn't a radio present in the system
RIL_E_RADIOREMOVED
 Fails the RIL calls which were in the process of being executed because the radio was removed
PDA Notifications
RIL_NCLASS_RADIOSTATE
 Radio State notifications (RIL_NCLASS_RADIOSTATE)
Notification Radio State Constants
RIL_NOTIFY_RADIOPRESENT
Notification corresponding to when the radio is inserted and the RIL Driver is ready to accept commands
RIL_NOTIFY_RADIONOTPRESENT
Notification corresponding to when the radio is removed and the RIL Driver is unloaded.
Additional Unrelated Notifications
RIL_NOTIFY_RADIOOFF
 For SetEquipmentState TxandRX off command
RIL_NOTIFY_RADIOON
 For SetEquipmentState TxandRX on command
 Attached as Appendix A is a list of the RIL APIs of a preferred embodiment of the present invention. These APIs are provided as examples only and should not limit the present invention.

We claim:

1. An abstraction layer for interfacing a computer to a telephony radio, comprising:
 a set of application programming interfaces (APIs) for abstracting out multiple radio technologies without knowledge of the telephony radio or cellular network, wherein the set of APIs correspond to call control functions, wherein the abstraction layer comprises a proxy layer and a driver layer, wherein when the proxy layer receives a call at a first interface to one of the set of APIs, the proxy layer transforms the API call to a command understood by the driver layer and sends the command to the driver layer at a second interface, and wherein the driver layer receives the command at the second interface and determines at least one standard telephony radio command corresponding to the called API and sends the telephony radio command to the telephony radio at a third interface, and wherein the proxy layer is hardware independent and the driver is hardware specific.

2. The abstraction layer of claim 1 wherein the telephony radio is one of a plurality of telephony radios which operates based on the standard telephony radio commands.

3. The abstraction layer of claim 1 wherein the set of APIs further correspond to short messaging system functions.

4. The abstraction layer of claim 3 wherein the set of APIs further correspond to network service functions.

5. The abstraction layer of claim 4 wherein the set of APIs further correspond to data connection functions.

6. The abstraction layer of claim 5 wherein the set of APIs further correspond to interface functions.

7. A radio interface layer of a telephone for facilitating communications between an application program module and a radio, comprising:
 a proxy layer for communicating with the application program module at a first interface and a driver layer at a second interface, wherein the proxy layer provides an API on the first interface for receiving application program calls to perform a particular function and wherein the proxy layer transforms the API calls to an input/output control (IOCTL) code and sends the IOCTL code to the driver layer at the second interface;
 wherein the driver layer communicates with the proxy layer at the second interface and the radio at a third interface, the driver layer receiving an IOCTL code at the second interface and transforming the IOCTL code into a command understood by the radio to perform the particular function and sending the radio command at the third interfaces; and
 wherein the proxy layer is hardware independent and the driver layer is hardware specific.

8. The radio interface layer of claim 7 wherein the driver layer further receives communications from the radio indicating that the particular function has been performed and wherein the driver layer sends a success code to the proxy layer indicating that the particular function has been performed.

9. A method for processing commands in a telephone comprising a proxy layer, a driver layer, an application and a radio, the method comprising the steps of:
 causing the application to call a radio interface layer (RIL) API in the proxy layer at a first interface, wherein the RIL API is associated with an action to be performed by the radio;
 causing the proxy layer to translate the RIL API into IOCTL codes;
 sending the IOCTL codes to the driver layer at a second interface;
 translating the IOCTL codes to a command corresponding to the action, wherein the command will be understood by the radio;
 sending the command to the radio at a third interface; and
 wherein the proxy layer is hardware independent and the driver layer is hardware specific.

10. The method of claim 9 wherein the command is an AT command.

11. The method of claim 9 wherein the command is one of a private API set defined by the radio manufacturer.

12. The method of claim 9 further comprising the step of generating in the RIL driver layer a unique ID associated with the RIL API.

13. The method of claim 12 further comprising the step of waiting for a response from the radio, and when received, calling back the calling application with the response and the unique ID returned from the call.

14. The method of claim 13 wherein the RIL driver matches the response from the radio with the unique ID and the RIL driver sends the response to the calling process via a callback function.

15. A method of communicating between a module and a radio comprising:
 (a) generating a radio interface layer (RIL) API call at one of a plurality of modules to perform a specific action;
 (b) sending the RIL API call to a proxy at a first interface;
 (c) at the proxy, converting the RIL API call to a command understood by a radio driver;
 (d) transmitting the radio driver command from the proxy to the radio driver at a second interface;
 (e) transmitting a radio command from the radio driver to the radio at a third interface;
 (f) performing the specific action at the radio; and wherein the proxy is hardware indepentent and the driver is hardware specific.

16. The method of claim further 15 comprising:

(g) in response to successfully performing the specific action, sending a success code from the driver to the proxy and from the proxy to the one of the plurality of modules that generated the RIL API.

17. The method of claim 16 wherein the RIL API, command and success code are associated with an identifier linking them together and linking them to the one of the plurality of modules that generated the RIL API call and wherein the radio driver receives the success code, and, using the identifier, matches the success code with the one of the plurality of modules that generated the RIL API call and sends the success code to the one of the plurality of modules that generated the RIL API call.

18. The method of claim 17 further comprising the step of:

(h) generating a notification at the radio in response to detecting data that needs to be reported to one of the plurality of modules;

(i) sending the notification to the radio driver.

19. The method of claim 18 further comprising the step of:

(j) sending the notification from the radio driver to the proxy.

20. The method of claim 19 further comprising the step of:

(k) sending the notification from the proxy to at least one of the plurality of modules.

21. The method of claim 18 wherein the data that needs to be reported comprises an incoming phone call to the radio.

22. The method of claim 18 wherein the data that needs to be reported comprises a signal strength change in the radio.

23. The method of claim 18 wherein the one of a plurality of modules is a TSP.

24. The method of claim 18 wherein the one of a plurality of modules is a SIM manager.

25. The method of claim 18 wherein the one of a plurality of modules is an emergency application for generating emergency calls.

26. The method of claim 18 wherein the one of a plurality of modules is a WAP layer.

27. The method of claim 18 wherein the one of a plurality of modules is a TAPI interface.

28. The method of claim 18 wherein the one of a plurality of modules is an ExTAPI interface.

29. The method of claim 18 wherein the one of a plurality of modules is connected to an application program module and receives instructions from the application program module to generate the RIL API call.

30. The method of claim 29 wherein the instructions provided by the application program module comprise instructions defined by the one of a plurality of modules and wherein the instructions are converted to the Rib API calls by the one of a plurality of modules.

* * * * *